(12) United States Patent  (10) Patent No.: US 8,170,967 B2
Talbot et al.  (45) Date of Patent: May 1, 2012

(54) KNOWLEDGE BASE COMPRISING EXECUTABLE STORIES

(75) Inventors: Patrick James Talbot, Colorado Springs, CO (US); Dennis Regan Ellis, Colorado Springs, CO (US); Jeffrey Allen McCartney, Colorado Springs, CO (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 552 days.

(21) Appl. No.: 12/132,335

(22) Filed: Jun. 3, 2008

(65) Prior Publication Data

US 2008/0301082 A1    Dec. 4, 2008

Related U.S. Application Data

(63) Continuation-in-part of application No. 10/881,279, filed on Jun. 30, 2004, now Pat. No. 7,917,460, and a continuation of application No. 10/958,753, filed on Oct. 5, 2004, now abandoned.

(51) Int. Cl.
*G06N 5/00* (2006.01)
(52) U.S. Cl. .......................................... 706/45; 706/55
(58) Field of Classification Search .................... 706/45, 706/55
See application file for complete search history.

(56) References Cited

U.S. PATENT DOCUMENTS

| | | | |
|---|---|---|---|
| 4,860,214 A | 8/1989 | Matsuda et al. | |
| 5,696,884 A | 12/1997 | Heckerman et al. | |
| 5,704,017 A | 12/1997 | Heckerman et al. | |
| 5,715,374 A | 2/1998 | Heckerman et al. | |
| 6,334,132 B1 | 12/2001 | Weeks | |
| 6,353,817 B1 | 3/2002 | Jacobs et al. | |
| 6,529,888 B1 | 3/2003 | Heckerman et al. | |
| 6,567,814 B1 | 5/2003 | Bankier et al. | |
| 6,687,685 B1 | 2/2004 | Sadeghi et al. | |
| 2001/0044791 A1 | 11/2001 | Richter et al. | |
| 2002/0103776 A1 | 8/2002 | Bella et al. | |
| 2002/0103793 A1 | 8/2002 | Koller et al. | |
| 2002/0128816 A1 | 9/2002 | Haug et al. | |
| 2003/0014229 A1 | 1/2003 | Borth et al. | |
| 2003/0018616 A1 | 1/2003 | Wilbanks et al. | |
| 2003/0028469 A1 | 2/2003 | Bergman et al. | |
| 2003/0028651 A1 | 2/2003 | Schreckengast et al. | |
| 2004/0024723 A1 | 2/2004 | Chen | |

FOREIGN PATENT DOCUMENTS

EP    0 616 288 A2    9/1994

(Continued)

OTHER PUBLICATIONS

Patrick J. Talbot: "*Semantic Networks: A Unifying Framework for Multistrategy Reasoning*"; Technology Review Journal—Spring/Summer 2003, pp. 59-76.

(Continued)

*Primary Examiner* — Michael B Holmes
*Assistant Examiner* — Lut Wong
(74) *Attorney, Agent, or Firm* — Tarolli, Sundheim, Covell & Tummino LLP

(57) ABSTRACT

Systems and methods are provided for assisted decision-making. A knowledge base comprises a plurality of executable stories. A given story comprises a belief network containing at least one associated hypothesis and evidence associated with the at least one hypothesis. The system further comprises at least one decision algorithm having respective associated input formats. A translation interface is operative to convert a given story from the knowledge base into a decision network having a format associated with the at least one decision algorithm.

20 Claims, 5 Drawing Sheets

FOREIGN PATENT DOCUMENTS

| | | |
|---|---|---|
| WO | WO 01/97164 A2 | 12/2001 |
| WO | WO 03/005248 A2 | 1/2003 |

OTHER PUBLICATIONS

Dennis R. Ellis: "*Offensive /Defensive Mission Planning: Detailed Plan Optimization Using Genetic Algorithms*"; Technology Review Journal—Fall/Winter 2001, pp. 29-40.

Patrick J. Talbot: "*Automated Discovery of Unknown Unknowns*"; pp. 1-7, Oct 2006.

Patrick J. Talbot: "*Military Decision Aids—A Robust Decision-Centered Approach*"; Technology Review Journal—Spring/Summer 2001, pp. 83-96.

Talbot, et al.: "*Computational Antiterrorism Solutions Using a General-Purpose Evidence Fusion Engine*"; Technology Review Journal—Spring/Summer 2002, pp. 23-36.

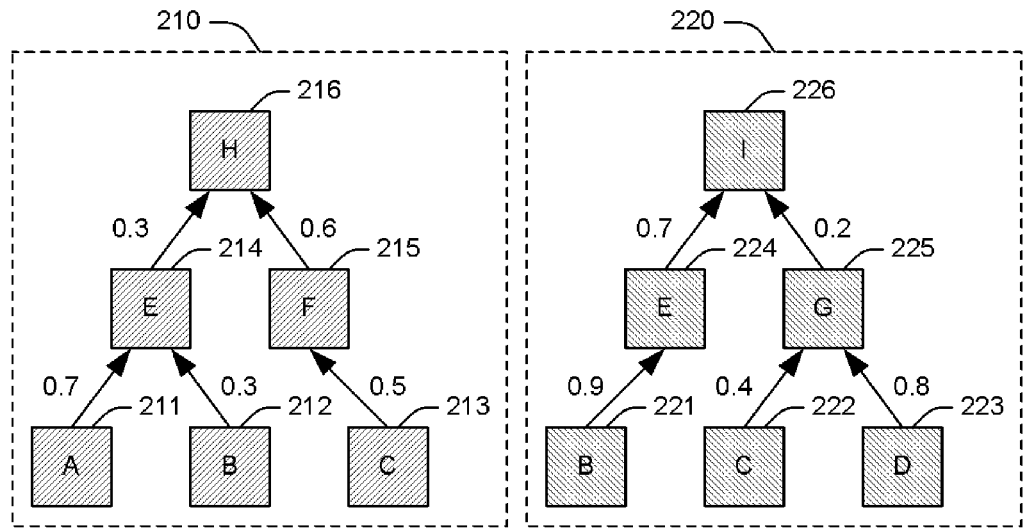
FIG. 4
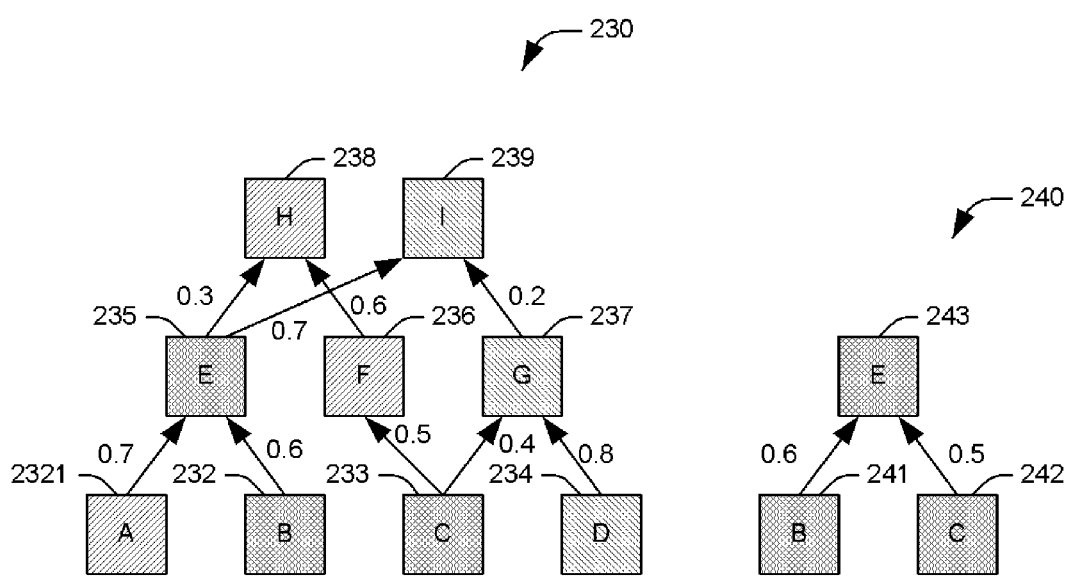
FIG. 5
FIG. 6

KNOWLEDGE BASE COMPRISING EXECUTABLE STORIES

CROSS-REFERENCES TO RELATED APPLICATIONS

The present application is a continuation-in-part of U.S. patent application Ser. No. 10/881,279, filed on Jun. 30, 2004 now U.S. Pat. No. 7,917,460, entitled: "Systems and Methods for Generating a Decision Network from Text". This application claims priority as a continuation of U.S. patent application Ser. No. 10/958,753, filed Oct. 5, 2004 now abandoned, entitled: "Knowledge Base Comprising Executable Stories". Each of these applications is incorporated herein by reference.

BACKGROUND OF THE INVENTION

There are different approaches for organizing information content extracted from text, such as decision graphs or data tables, namely, a knowledge-based approach and a database-based approach. Using the knowledge-based approach, a person (known as a knowledge engineer) interviews an expert in a given field to obtain knowledge about the given field. The knowledge engineer and expert first determine the distinctions of the subject matter that are important for decision making in the field of the expert. These distinctions correspond to questions about the variables in the domain of interest, referred to as the hypotheses. For example, if a decision graph is to be used to predict the age of a customer based on the products that customer bought in a store, there would be a variable for "age" and a variable for all relevant products. The knowledge engineer and the expert next determine the structure of the decision graph and the corresponding parameter values that quantify the associated uncertainty.

In the database approach, the knowledge engineer and the expert first determine the variables of the domain. Next, data is accumulated for those variables, and an algorithm is applied that creates one or more decision graphs from this data. The accumulated data comes from real world instances of the domain or hypothesis. That is, real world instances of decision making in a given field. For some decision-making applications, however, it can be difficult in practice to find sufficient applicable data to construct a viable decision network.

Decision makers often find it difficult to mentally combine evidence since the human tendency is to postpone risky decisions when data is incomplete, jump to conclusions, or refuse to consider conflicting data. Those versed in classical (frequentist) statistics realize that in situations where evidence is sparse, the use of a decision network is desirable. Unfortunately, traditional means of generating a decision network are labor intensive, requiring many hours of labor from an analyst knowledgeable about the desired application.

SUMMARY OF THE INVENTION

In accordance with one aspect of the present invention, an assisted decision-making system is provided. A knowledge base comprises a plurality of executable stories. A given story comprises a belief network containing at least one associated hypothesis and evidence associated with the at least one hypothesis. Each hypothesis can have labeled characteristics and values of characteristics. The system further comprises at least one decision algorithm having respective associated input formats. A translation interface is operative to convert a given story from the knowledge base into a decision network having a format associated with the at least one decision algorithm.

In accordance with another aspect of the present invention, a method for assisting decision making is provided. A plurality of executable stories are stored in a knowledge base. A story from the plurality of executable stories is converted into a decision network in a format associated with a decision algorithm associated with the knowledge base. The decision network is processed at the decision algorithm to produce a revised decision network. The revised decision network is converted back into an executable story.

BRIEF DESCRIPTION OF THE DRAWINGS

FIG. 4 illustrates two stories that can be stored in a knowledge base in accordance with an aspect of the present invention.

FIG. 5 illustrates the union of the two stories illustrated in FIG. 5.

FIG. 6 illustrates the intersection of the two stories illustrated in FIG. 5.

DETAILED DESCRIPTION OF INVENTION

The present invention relates to systems and methods for assisted decision making utilizing a knowledge base that comprises a plurality of stories, where a story is an executable belief network augmented by one or more characteristics of the hypotheses comprising the belief network, the evidence, and the content from which the evidence was extracted. By constructing the knowledge base from executable elements, the stories can be manipulated and updated in real time with new evidence. For example, a union or intersection between two stories or portions of stories can be formed, with appropriate belief values calculated from the known values, without the need for human intervention. Further, the knowledge base can be meaningfully shared between decision makers who may utilize different bodies of evidence.

In certain aspects of the invention, the stories comprising the knowledge base can include Dempster-Shafer belief networks. Dempster-Shafer belief network include node parameters that conform to the Dempster-Shafer combination rule, which is based on an evidential interval: the sum of a belief value, a disbelief value, and an unknown value is equal to one. The Dempster-Shafer Combination Rule for fusion of evidence provides for nodes in a network represented as evidential intervals with values from the set of real numbers ($0 <= n <= 1$). Three parameters specify each node: "belief" (B), "unknown" (U) and "disbelief" (D). The unknown parameter is computed as: $U = 1 - B - D$. The Dempster-Shafer Combination Rule is symmetric, bounded, commutative, and associative.

Figure 1:
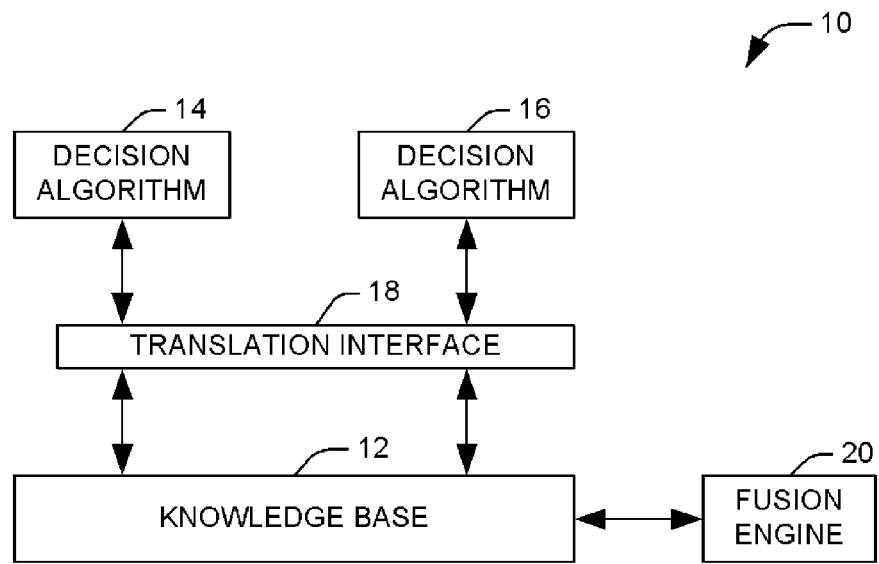
FIG. 1 illustrates an assisted decision making system in accordance with an aspect of the present invention.

FIG. 1 illustrates an assisted decision making system 10 utilizing a knowledge base 12 comprising a plurality of executable stories. The knowledge base 12 is made available to a plurality of decision networks 14 and 16 through a translation interface 18. A given story comprises a belief network, a body of evidence utilized by its associated decision making algorithm (e.g., 14), and the context from which the evidence was extracted. The stories, along with other stories stored in the knowledge base 12 can be manipulated by a fusion engine to consolidate evidence associated with the stories. For example, two stories stored in the knowledge base can be merged, with the evidence from common hypothesis being combined to provide a belief value for the common hypotheses.

It will be appreciated that the stories in the knowledge base incorporate executable belief networks and a body of evidence for evaluating their associated belief network. By executable, it is meant that the stories in the knowledge base are objects capable of independently updating their internal values (e.g., in accordance with the Dempster-Shafer combinational rule or Bayesian theory) to achieve a mathematically correct state given an external perturbation. The executable nature of these stories allows an analyst a great degree of freedom in forecasting the response of the various decision algorithms 14 and 16 to new evidence or changed, as a change in the central knowledge base can be quickly recognized and incorporated into the analysis of the decision algorithms 14 and 16. Further, the executable nature of the stories allows a given story to be evaluated independently of the knowledge base, allowing the stories to be easily transferred between multiple systems or analysts.

The plurality of decision algorithms 14 and 16 have respective input formats for importing decision networks associated with the assisted decision making system 10. For example, a case based reasoning algorithm can process decision networks in tabular form, comprising a table of criteria and scores relating to a plurality of options considered by the algorithm. The knowledge base 12 and the decision algorithms are connected via the translation interface 18 that is operative to convert an executable story into a decision network in one or more of the input formats associated with the plurality of decision algorithms. For example, where one of the decision algorithms (e.g., 14) is a case based reasoning algorithm, a story or portion of a story from the knowledge base 12 can be converted into a tabular form consistent with the case based reasoning algorithm at the translation interface 18 and then provided to the algorithm for analysis. Accordingly, all of the decision algorithms can draw on the central knowledge base while receiving data in their associated formats.

Similarly, the translation interface 18 can convert the decision outputs from the plurality of decision making algorithms 14 and 16 into stories. For example, the translation interface 18 can convert a tabular output from a case based reasoning algorithm by creating hypotheses from the options in the table rows from and supporting them with evidence provided within the columns of the table, such as the criteria utilized by the system. The scores determined by the algorithm, along with other information within the table, can be used to determine weight values for the evidence provided. Accordingly, the stories stored in the knowledge base can comprise stories submitted to the plurality of decision algorithms 14 and 16, as well as evidence added to the knowledge base via a user interface and an associated information extraction component.

Figure 2:
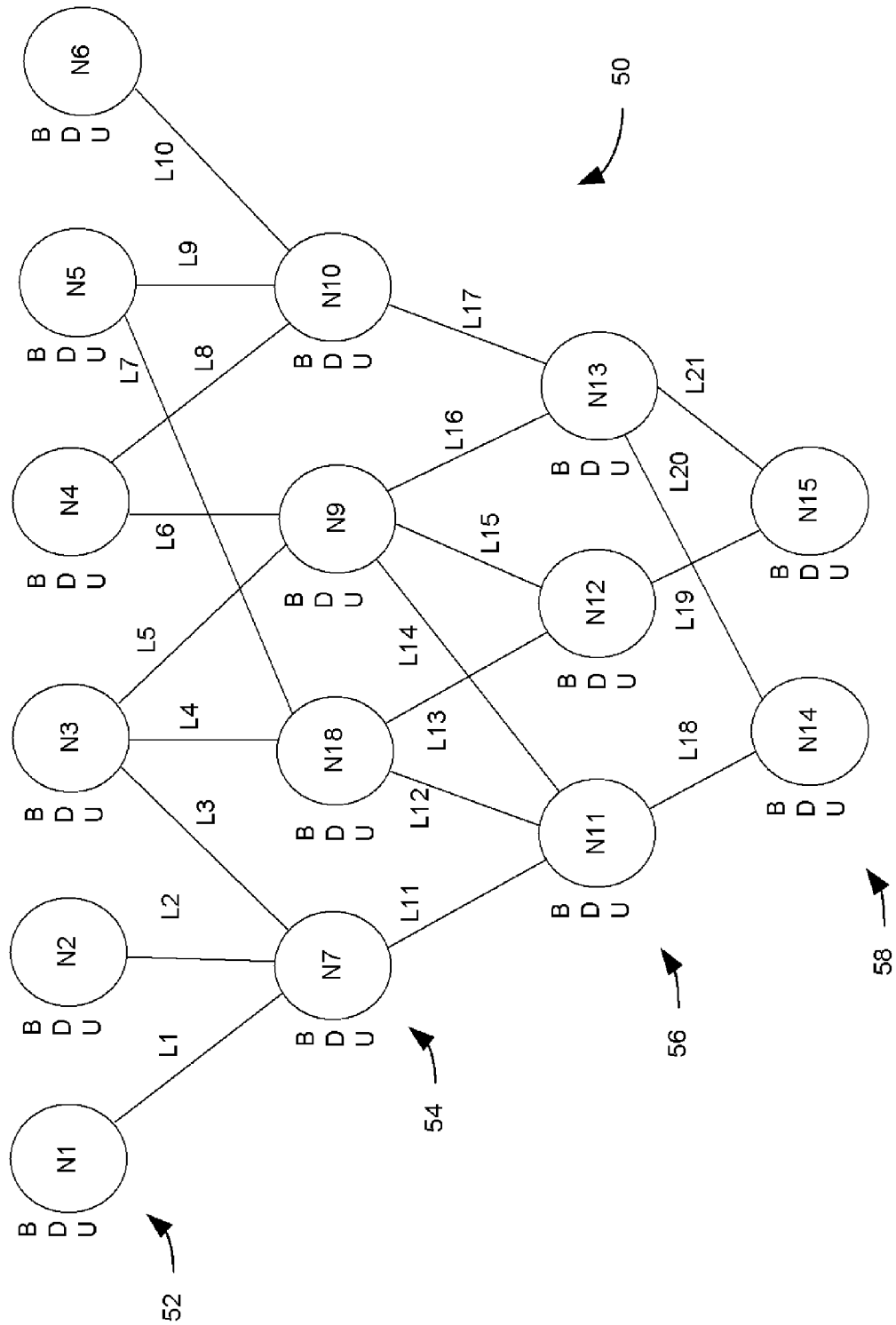
FIG. 2 illustrates a representation of a belief network in accordance with an aspect of the present invention.

FIG. 2 illustrates a representation of a belief network 50 in accordance with an aspect of the present invention. The belief network 50 of FIG. 2 is illustrated as a Dempster-Shafer belief network, but it will be appreciated that other belief networks, such as Bayesian belief networks, can be utilized to form a knowledge base in accordance with the present invention. The decision network 50 includes a top layer 52, a first intermediate layer 54, a second intermediate layer 56, and a bottom layer 58. The top layer 52 includes nodes N1-N6 linked to the first intermediate or hypothesis layer 54 by links or multipliers L1-L10. The first intermediate layer 54 includes nodes N7-N10 linked to the second intermediate layer 54 by links or multipliers L11-L17. The second intermediate layer 56 includes nodes N11-N13 linked to the bottom layer 58 by links or multipliers L18-L21. Each node represents a given variable and hypothesis associated with that variable that can affect the variable and hypothesis of other nodes in lower layers mathematically. Associated with each of the nodes N1-N15 are three parameters, which are a belief parameter B, a disbelief parameter D, and an unknown parameter U. The parameters B, D, and U conform to the Dempster-Shafer evidential interval such that the parameter B, D and U add up to one for each node N1-N15.

The links represent multipliers or weights of a given parameter on a lower node. Link values can be constant, or computed by an algorithm. For example, the belief of node N7 of the first intermediate layer 54 depends on the belief of nodes N1, N2, and N3, each multiplied by its respective link value L1, L2, and L3. Additionally, the disbelief of node N7 of the first intermediate layer 54 depends on the disbelief of nodes N1, N2, and N3, each multiplied by its respective link value L1, L2, and L3. The unknown is computed based on the Dempster-Shafer combination rule. The belief and disbelief of node N7 then propagate to N11 through link L11, which is combined with the belief and disbelief of N18 multiplied by link L12 and the belief and disbelief of node N9 multiplied by link L14. The belief and disbelief of node N11 then propagate to node N14 through link L18 which is combined with the belief and disbelief of N13 multiplied by link L20. The unknowns of each row can be evaluated using the Dempster-Shafer combination rule. Similar propagation occurs to provide the beliefs, the disbeliefs, and unknowns of the node N15.

Figure 3:
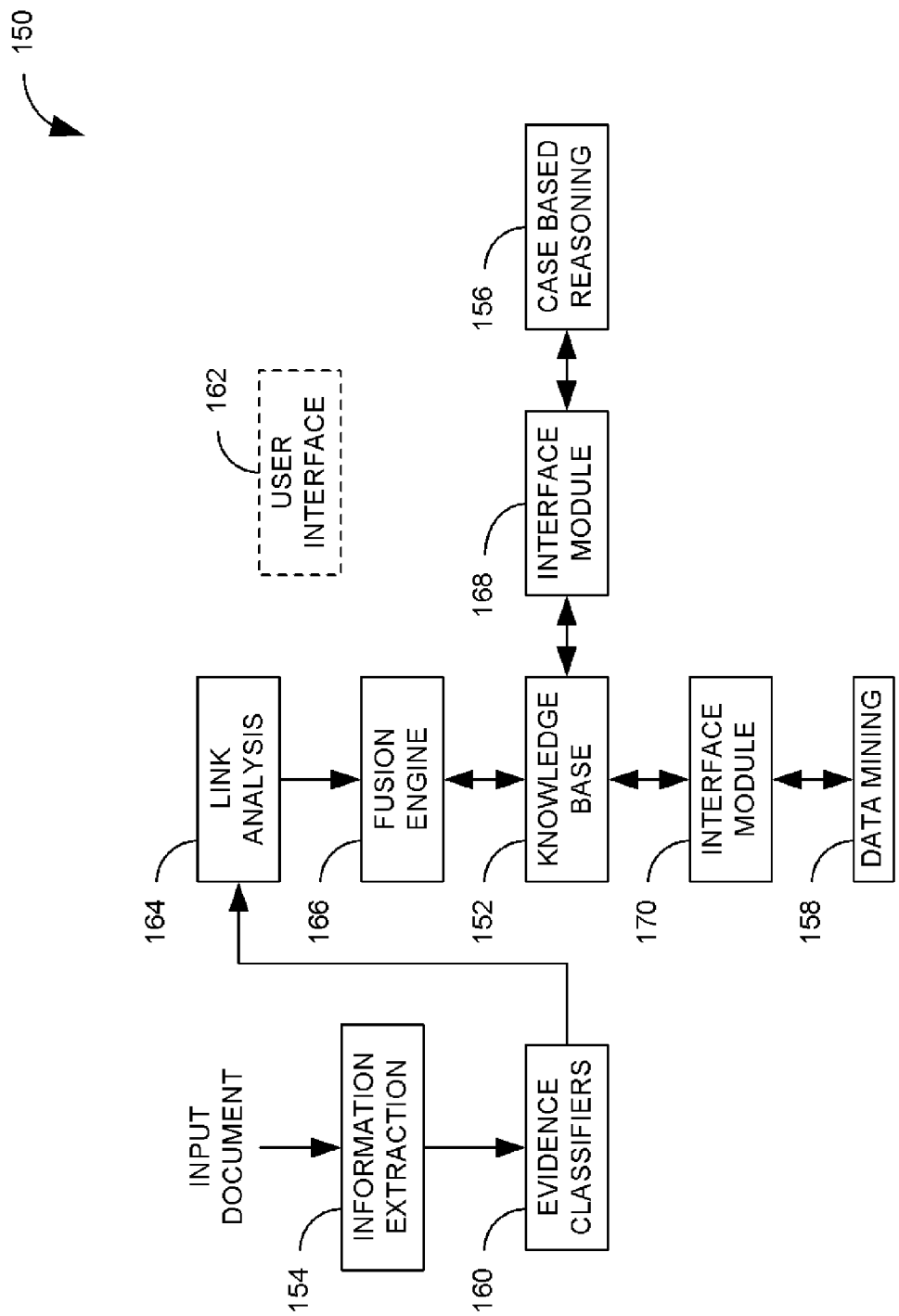
FIG. 3 illustrates an assisted decision making system utilizing an executable knowledge base in accordance with an aspect of the present invention.

FIG. 3 illustrates an assisted decision making system 150 utilizing an executable knowledge base 152. It will be appreciated that the illustrated system 150 can be implemented as one or more computer programs, executable on one or more general purpose computers such as a computer hard drive, random access memory, or a removable disk medium. Accordingly, any structures herein described can be implemented alternately as dedicated hardware circuitry for the described function or as a program code stored as part of a computer-assessable memory (e.g., magnetic storage media, flash media, CD and DVD media, etc.). Functions carried out by the illustrated system, but not helpful in understanding the claimed invention, are omitted from this diagram. For example, a system implemented as a computer program would require some amount of working memory and routines for accessing this memory. Such matters are understood by those skilled in the art.

In accordance with an aspect of the present invention, the knowledge base 152 is comprised of a plurality of stories, where each story comprises an executable belief network comprising at least one hypothesis, evidence supporting the at least one hypothesis, and a reference (e.g., a pointer) to the context from which the evidence was gathered. Each story is executable, such that it can produce mathematically consistent results in response to any change in its associated evidence, belief values, or weights. Accordingly, the stories can be updated and propagated to multiple decision algorithms in real time, allowing for a flexible exchange between a large number of decision algorithms or analysts.

In the illustrated example, evidence and stories can be input into the knowledge base in a number of ways. For example, an information extraction component 154 can be used to reduce an evidence source, such as a text document or a transcripted conversation, into a desired evidence format. This evidence can be linked with existing stories in the knowledge base or new stories can be assembled in response to the evidence. Stories and portions of stories can also be provided to the knowledge base or amended within the knowledge base using other decision algorithms 156 and 158. For example, the illustrated example includes a case-base reasoning algorithm 156 that utilizes existing stories in the knowledge base to improve or repair a decision network being constructed by the system 150. Similarly, a data mining algorithm 158 can determine additional hypotheses and linkages among available hypotheses in the knowledge base 152 to refine a decision network being constructed by the system.

The information extraction component 154 breaks down the text segments into individual words or phrases, interprets the context and meaning of the various words or phrases, and uses the extracted information to generate a template representing the text segment. For example, the information extraction component 154 can look for details relating to an event described in the document, such as the nature of the event, the cause or motivation for the event, the mechanism of the event, the identity of an actor, the location of the event, the time or date of the event, and the magnitude of the event. Each of these details can be added to a template related to the text segment. In accordance with one aspect of the invention, the information extraction component 154 can look for hedge words (e.g., maybe, probably, certainly, never) within the text segment. The information extraction component 154 can use a co-referencing routine to determine what nouns relate to a given hedge word, and use this information to determine the weight of the evidence associated with the template, in the form of belief values and disbelief values.

To provide a greatly simplified example, the information extraction component 154 might receive a statement from a bank teller that they are certain that Mr. Brown has made a deposit of ten-thousand dollars to a corporate account via a personal check at a bank in downtown Atlanta. The information extraction component 154 would locate the nouns within the sentence as well as words such as "via," "at," and "certain" to determine the relationships between the various nouns and the location of certain information. Thus, the question of location can be answered with the noun or string of nouns following "at" (e.g., bank in downtown Atlanta). The mechanism of the event can be determined by the nouns following "via" (e.g., personal check). The magnitude of the event can be determined by finding the numbers (e.g., ten-thousand), and other details can be provided by classifying the remaining nouns (e.g., Mr. Brown is likely the actor; the event is likely a deposit, etc.). The word "certain," once it is verified that it is referring the deposit, can be used to assign a large belief value to the event.

During operation, objects of evidence can be provided to one or more evidence classifiers 160. The evidence classifiers 160 assign the evidence to associated hypotheses according to the evidence content. It will be appreciated that the evidence classifiers 160 can assign the templates to one or more existing hypotheses in the knowledge base 152 or generate a new hypothesis (e.g., from a large independent ontology or the Internet). The hypotheses within each network can be derived from previously generated networks, new hypotheses added to accommodate additional evidence, and a priori knowledge of the problem added by an analyst through a user interface 162. In an exemplary embodiment, the evidence classifiers 160 can include a rule-based classifier that classifies the templates according to a set of user defined rules. For example, rules can be defined relating to the fields within the template or the source of the data. Other classifiers can include, for example, supervised and unsupervised neural network classifiers, semantic network classifiers, statistical classifiers, and other classifier models. These classifiers can be orchestrated to increase the efficiency of the classification. For example, the rule-based classifier can be applied first, and if a rule is not actuated, the statistical classifier can be used. If a pre-specified probability threshold is not reached at the statistical classifier, the semantic distance classifier can be applied and the results shown to the user for validation.

Once the templates have been assigned to appropriate hypotheses, the templates are passed to a link analysis component 164. The link analysis component 164 determines the relatedness of two hypotheses according to relationships in the evidence associated with the templates. One factor utilized by the link analysis component 164 is the co-occurrence of various key words and phrases in the evidence templates assigned to two hypotheses. The frequency of co-occurrence of evidence among the various hypotheses can be used to calculate initial strength values, or weights, to the links between hypotheses. Link strength indicates the degree of influence a given hypothesis and its associated belief and disbelief values have on a linked hypothesis.

The link strengths and hypotheses are then provided to a fusion engine 166. The fusion engine 166 arranges the hypotheses according to a predefined structure to establish a hierarchy among the hypotheses. For example, the predefined structure can include a number of categories, representing layers within the hierarchy, with the proper category for a given hypothesis being determined when it is entered into the knowledge base 152. Once the hypotheses have been categorized, they can be linked according to the determined link strengths to form a preliminary belief network. In the illustrated example, a Dempster-Shafer belief network is utilized, but it will be appreciated that other belief network architectures (e.g., Bayesian) can be used as well. This preliminary network can be reviewed by a human analyst through the user interface 162 to ensure that the hypotheses are organized and linked correctly. The network is then fused with its associated evidence and the context from which the evidence was drawn to form an executable story. The executable story can mathematically reconcile its associated belief, disbelief, and unknown values according to the Dempster-Shafer combinational rule.

In accordance with an aspect of the present invention, the fusion engine 166 can also provide internal management of the stories stored within the knowledge base. For example, the fusion engine 166 can also be used to add, remove, or modify hypothesis and evidence in an existing story in the knowledge base in response to new evidence or user input. Similarly, the fusion engine 166 can be rank stories by average belief or disbelief in the hypotheses that comprise the underlying belief networks and maintain them within the knowledge base in ranked form.

Executable stories generated at the fusion engine 166 are stored in the knowledge base 152, where they can be accessed and modified by other decision algorithms 156 and 158 associated with the system. The executable stories can be provided to the decision algorithms through respective interface modules 168 and 170 to allow the decision algorithms to further refine the stories. For example, the stories in the knowledge base 152 can be searched by a data mining algorithm 158 through its associated interface module 170. The interface module 170 transmits the stories to the data mining algorithm 158 in an appropriate input format, such as a directed graph. It will be appreciated that the desired input form will vary with the specifics of the data mining algorithm. The data mining algorithm 158 can examine existing hypothesis within stories stored in the knowledge base 152 to determine appropriate one or more appropriate hypotheses for a body of evidence. These hypotheses can then be used to generate a new story or supplement an existing story stored in the knowledge base.

Similarly, a story of interest can be provided to a case based reasoning component 156 through its associated interface module 168 when it meets certain selection criteria. The interface module 168 associated with the case based reasoning component can translate the executable stories into a decision network in tabular form appropriate for input into the case based reasoning component 156. To refine or correct the story of interest, the case based reasoning component 156 can access successful stories located in the knowledge base in the tabular format through the interface module 168 and implement portions of the successful stories into the decision network as new network fragments. For example, when a series of evidence templates that are not associated with a known hypothesis are inputted to the system 150, the case based reasoning component 156 can determine if similar evidence is present within a story stored with the knowledge base. If so, one or more hypotheses from the stored story can be adopted (e.g., by computing the union the story of interest and a portion of the stored story) to produce a refined instantiation of the story of interest. The decision network can then be translated back into an executable story for storage in the knowledge base.

FIGS. 4-6 illustrate the manipulation of stories within the knowledge base to generate additional stories. For example, a user can instruct the system through a user interface to construct a union or intersection of stories or story portions. Since the stories are executable, the combined stories can generate mathematically consistent results from the evidence contained in the stories. In the illustrated embodiments, the stories comprise Bayesian networks and are mathematically reconciled via Bayesian theory. FIG. 4 illustrates two stories 210 and 220, each comprising six hypotheses 211-216 and 221-226. The plurality of hypotheses are linked by a plurality of links, each link having an associated link strength. A given story also includes evidence associated with the hypotheses, indicated herein via shading within the hypotheses.

FIG. 5 illustrates the union 230 of the two stories 210 and 220 illustrated in FIG. 4. The union 230 illustrated in FIG. 5 contains all of the hypotheses 231-239 contained in the original two stories 210 and 220. The union of two stories can be used to combine the work of multiple analysts or decision algorithms, combining the evidence and hypotheses generated by each. To form the union, the evidence within each common hypothesis is combined to refine the belief values associated with the hypotheses. Links between nodes in the new network are those that exist in either merging network. Where the links are present in both networks, their weights are the average of those from the merging networks. Once all of the evidence has been combined and the link values have been determined, the executable story mathematically reconciles the belief values of the hypotheses in accordance with Bayesian theory, and the new story can be stored in the knowledge base for export to other analysts or decision algorithms.

FIG. 6 illustrates the intersection 240 between the two stories 210 and 220 illustrated in FIG. 4. An intersection can be used, for example, to perform a sensitivity analysis of one of the two stories. The intersection 240 contains only those hypotheses 241-243 that are common to both of the stories 210 and 220 utilized in the intersection. The evidence within the common hypotheses is combined to refine the belief values associated with the hypotheses. Links between nodes in the new network are those that exist in either merging network. Where the links are present in both networks, their weights are the average of those from the merging networks. Once all of the evidence has been combined and the link values have been determined, the executable story mathematically reconciles the belief values of the hypotheses in accordance with Bayesian theory, and the new story can be stored in the knowledge base for export to other analysts or decision algorithms.

Figure 7:
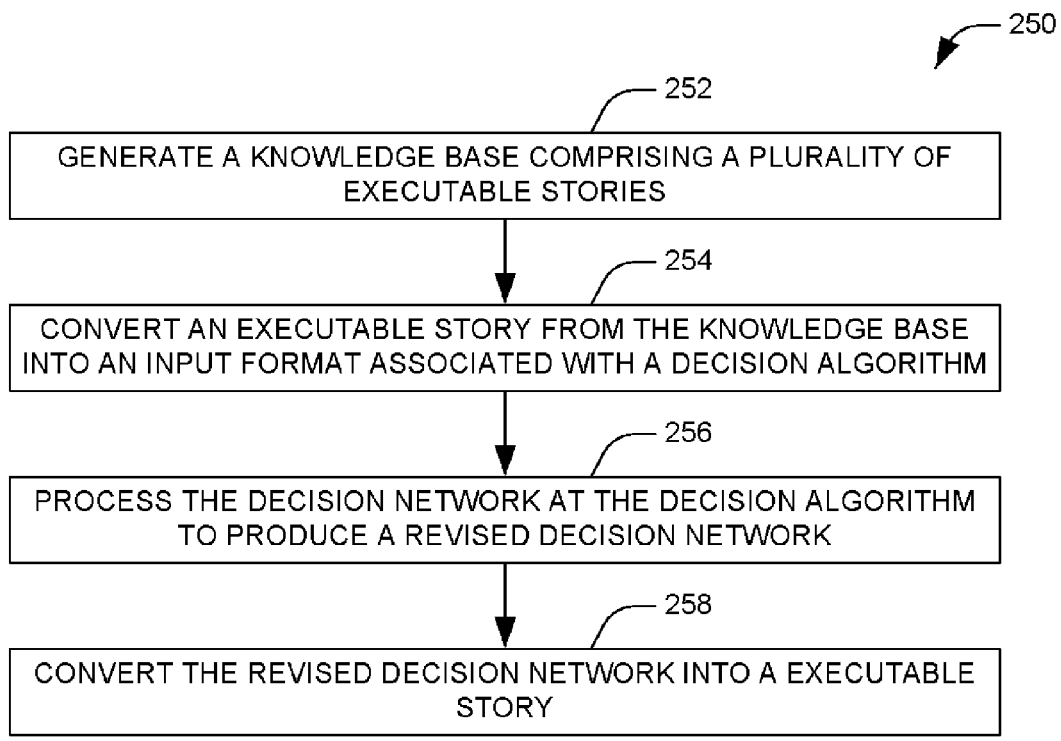
FIG. 7 illustrates a methodology for constructing a decision network from a plurality of text documents in accordance with an aspect of the present invention.

In view of the foregoing structural and functional features described above, methodology in accordance with various aspects of the present invention will be better appreciated with reference to FIG. 7. While, for purposes of simplicity of explanation, the methodology of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 7 illustrates a methodology 250 for assisted decision making in accordance with the present invention. At 252, a knowledge base is generated comprising a plurality of executable stories, where each story comprises a belief network, its associated evidence, and a reference to the context to which the evidence was drawn. Stories can be ranked by average belief or disbelief in the hypotheses that comprise the underlying belief networks. The knowledge base can be generated from the output of a number of associated belief networks, from a context extraction component associated with the knowledge base, and from user input at a user interface. At 254, an executable story is converted into a decision network having a format associated with one or more decision algorithms associated with the knowledge base. For example, the story can be converted into a decision graph, a case based reasoning table, or another form of semantic network.

At 256, the decision algorithm processes the decision network to produce a revised network. For example, a case based reasoning algorithm can review past successful stories to add or modify a portion of the decision network. Similarly, a data mining algorithm can draw upon stories in the knowledge base to determine additional hypotheses, links, or evidence for a given decision network. Once the decision network has been revised, it can be translated back into an executable story at step 258. The executable story can be utilized for decision making or stored in the knowledge base for later reference.

Figure 8:
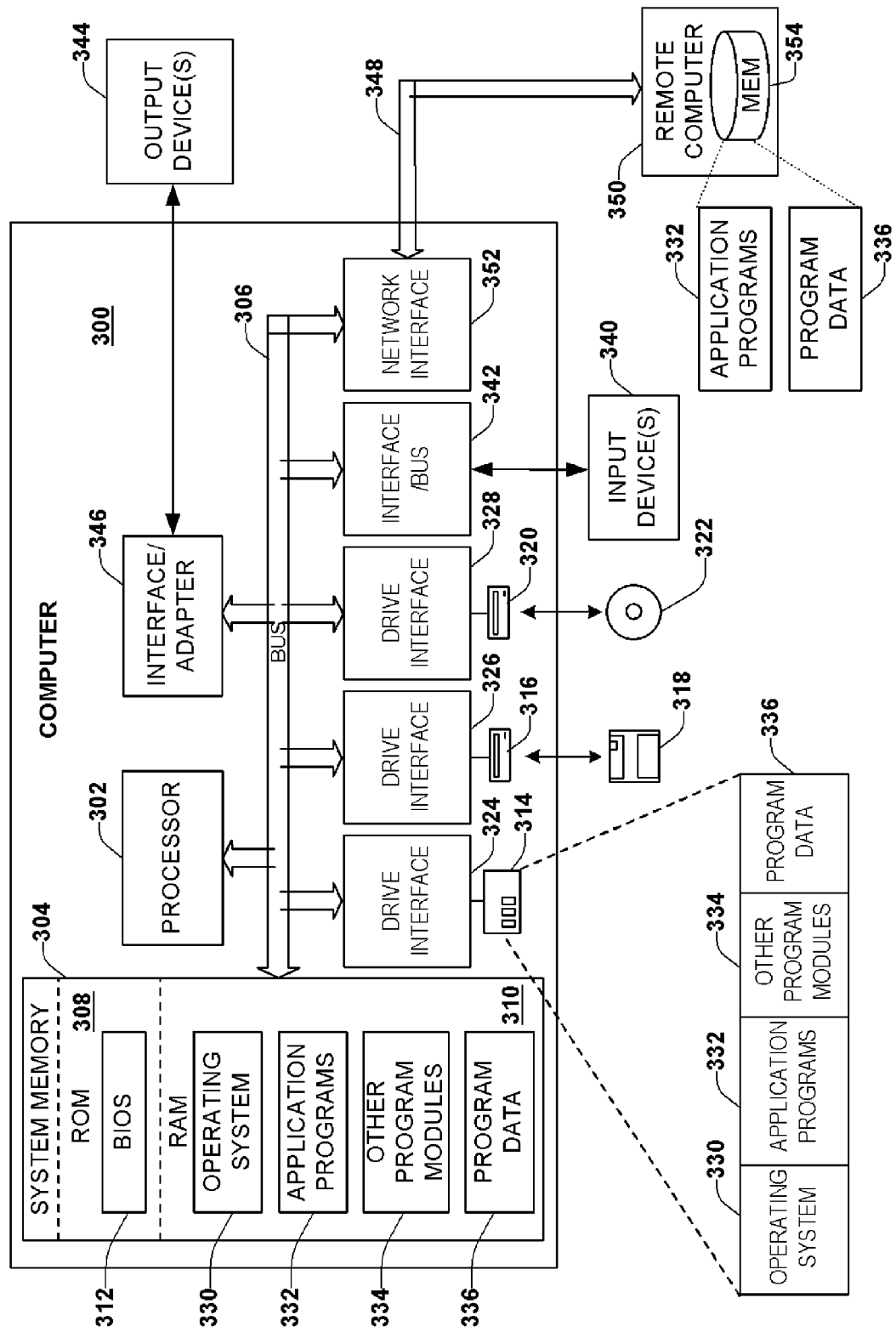
FIG. 8 illustrates a schematic block diagram of an exemplary operating environment for a system configured in accordance with an aspect of the present invention.

FIG. 8 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. A system bus 306 couples various system components, including the system memory 304 to the processor 302. Dual microprocessors and other multi-processor architectures can also be utilized as the processor 302. The system bus 306 can be implemented as any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) 312 can reside in the ROM 308, generally containing the basic routines that help to transfer information between elements within the computer system 300, such as a reset or power-up.

The computer system 300 can include a hard disk drive 314, a magnetic disk drive 316, e.g., to read from or write to a removable disk 318, and an optical disk drive 320, e.g., for reading a CD-ROM or DVD disk 322 or to read from or write to other optical media. The hard disk drive 314, magnetic disk drive 316, and optical disk drive 320 are connected to the system bus 306 by a hard disk drive interface 324, a magnetic disk drive interface 326, and an optical drive interface 334, respectively. The drives and their associated computer-readable media provide nonvolatile storage of data, data structures, and computer-executable instructions for the computer system 300. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 310, including an operating system 330, one or more application programs 332, other program modules 334, and program data 336.

A user may enter commands and information into the computer system 300 through user input device 340, such as a keyboard, a pointing device (e.g., a mouse). Other input devices may include a microphone, a joystick, a game pad, a scanner, a touch screen, or the like. These and other input devices are often connected to the processor 302 through a corresponding interface or bus 342 that is coupled to the system bus 306. Such input devices can alternatively be connected to the system bus 306 by other interfaces, such as a parallel port, a serial port or a universal serial bus (USB). One or more output device(s) 344, such as a visual display device or printer, can also be connected to the system bus 306 via an interface or adapter 346.

The computer system 300 may operate in a networked environment using logical connections 348 to one or more remote computers 350. The remote computer 348 may be a workstation, a computer system, a router, a peer device or other common network node, and typically includes many or all of the elements described relative to the computer system 300. The logical connections 348 can include a local area network (LAN) and a wide area network (WAN).

When used in a LAN networking environment, the computer system 300 can be connected to a local network through a network interface 352. When used in a WAN networking environment, the computer system 300 can include a modem (not shown), or can be connected to a communications server via a LAN. In a networked environment, application programs 332 and program data 336 depicted relative to the computer system 300, or portions thereof, may be stored in memory 354 of the remote computer 350.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. For example, while a number of examples herein have discussed the construction of Dempster-Shafer belief networks, it will be appreciated that other decision networks, such as Bayesian belief networks and Markov networks, can be constructed from text in accordance with the present invention. Accordingly, the present invention is intended to embrace all such alterations, modifications, and variations that fall within the spirit and scope of the appended claims.

What is claimed is:

1. An assisted decision-making system comprising:
a processor; and
a memory comprising:
    a knowledge base comprising a plurality of executable stories, a given executable story comprising:
        an executable belief network comprising a plurality of hypotheses; and
        a plurality of evidence templates representing respective text segments containing information related to the plurality of hypotheses comprising the belief network, a given evidence template listing at least two of the location, magnitude, mechanism, and associated actor of an event of interest described in a represented text segment; and
    computer executable instructions, executed by the processor, comprising a plurality of decision algorithms that retrieve executable stories from the knowledge base, modify the retrieved executable stories, and return the modified executable stories to the knowledge base.

2. The system of claim 1, at least one of the plurality of executable stories comprising a Dempster-Shafer belief network.

3. The system of claim 1, the computer executable instructions further comprising a fusion engine that is operative to add and remove hypotheses from the plurality of executable stories associated with a given executable story, and modify the plurality of hypotheses associated with the executable story.

4. The system of claim 3, the fusion engine being operative to determine the logical intersection between a first belief network, associated with a first story, and a second belief network, associated with a second story.

5. The system of claim 3, the fusion engine being operative to determine the logical union between a first belief network, associated with a first story, and a second belief network, associated with a second story.

6. The system of claim 1, the computer executable instructions comprising at least one information extractor that reduces evidence from an external source into an evidence template that is appropriately formatted for the knowledge base.

7. The system of claim 6, the computer executable instructions further comprising at least one evidence classifier that evaluates the evidence template to associate the template with a hypothesis from the plurality of hypotheses associated with an executable story from the plurality of executable stories within the knowledge base.

8. The system of claim 6, the plurality of decision algorithms comprising a data mining algorithm that examines a given executable story from the plurality of hypotheses to determine one or more appropriate hypotheses from the plurality of hypotheses associated with the executable story to associate with the evidence template.

9. The system of claim 1, the plurality of decision algorithms comprising a case based reasoning system that modifies a first executable story from the plurality of executable stories according to an analysis of at least a second executable story from the plurality of executable stories provided to the case based reasoning algorithm from the knowledge base.

10. The system of claim 1, the computer executable instructions comprising a translation interface that converts a given executable story from the plurality of executable stories in the knowledge base into a format associated with at least one of the plurality of decision algorithms.

11. The system of claim 10, the translation interface comprising first and second interface modules, associated respectively with first and second decision algorithms from the plurality of decision algorithms, each of the first and second interface modules being operative to convert an executable story from the plurality of executable stories in the knowledge base into an appropriate input format for its associated decision algorithm.

12. A computer-accessible memory operative in a general purpose processor, comprising:
  a knowledge base comprising a plurality of executable stories, a given executable story comprising:
    an executable belief network comprising a plurality of hypotheses; and
    a plurality of evidence templates representing respective text segments containing information related to the plurality of hypotheses comprising the belief network, a given evidence template listing at least two of the location, magnitude, mechanism, and associated actor of an event of interest described in a represented text segment; and
  a plurality of decision algorithms that retrieve executable stories from the knowledge base, modify the retrieved executable stories, and return the modified stories to the knowledge base; and
  a translation interface that converts a given story from the knowledge base into a format associated with at least one of the plurality of decision algorithms.

13. The computer-accessible memory of claim 12, further comprising a fusion engine that is operative to add and remove hypotheses from the plurality of executable stories associated with a given executable story, and modify the plurality of hypotheses associated with the executable story.

14. The computer-accessible memory of claim 12, further comprising at least one information extractor that reduces evidence from an external source into an evidence template that is appropriately formatted for the knowledge base.

15. The computer-accessible memory of claim 14, the computer further comprising at least one evidence classifier that evaluates the evidence template to associate the template with a hypothesis within the knowledge base.

16. The computer-accessible memory of claim 12, the translation interface comprising first and second interface modules, associated respectively with first and second decision algorithms from the plurality of decision algorithms, each of the first and second interface modules being operative to convert a story from the knowledge base into an appropriate input format for its associated decision algorithm.

17. An assisted decision making system, comprising:
  a processor; and
  a memory comprising:
    a knowledge base comprising a plurality of executable stories, a given executable story comprising:
      an executable belief network comprising a plurality of hypotheses; and
      a plurality of evidence templates representing respective text segments containing information related to the plurality of hypotheses comprising the belief network, a given evidence template listing at least two of the location, magnitude, mechanism, and associated actor of an event of interest described in a represented text segment; and
    computer executable instructions, executed by the processor, comprising:
      at least one information extractor that reduces evidence from an external source into evidence templates that are appropriately formatted for the knowledge base;
      at least one evidence classifier that evaluates the evidence templates to associate each template with a hypothesis within the knowledge base;
      a plurality of decision algorithms that retrieve executable stories from the knowledge base, modify the retrieved executable stories, and return the modified stories to the knowledge base; and
      a translation interface that converts a given story from the knowledge base into a format associated with at least one of the plurality of decision algorithms.

18. The system of claim 17, the plurality of decision algorithms comprising a data mining algorithm that examines a given executable story from the plurality of hypotheses to determine one or more appropriate hypotheses from the plurality of hypotheses associated with the executable story to associate with the evidence template.

19. The system of claim 17, the plurality of decision algorithms comprising a case based reasoning system that modifies a first executable story from the plurality of executable stories according to an analysis of at least a second executable story from the plurality of executable stories provided to the case based reasoning algorithm from the knowledge base.

20. The system of claim 17, further comprising a fusion engine that is operative to add and remove hypotheses from the plurality of executable stories associated with a given executable story, and modify the plurality of hypotheses associated with the executable story.

* * * * *